(12) United States Patent
Hart et al.

(10) Patent No.: US 10,990,361 B1
(45) Date of Patent: Apr. 27, 2021

(54) CUSTOMIZABLE GRAPHICAL USER INTERFACE FOR DATA MANAGEMENT

(71) Applicant: Microsoft Technology Licensing, LLC, Redmond, WA (US)

(72) Inventors: Caitlin Kehoe Hart, Portland, OR (US); Hiroshi Tsukahara, Sammamish, WA (US); Eric Wesley Mercer, Seattle, WA (US); Mirela Dal Col Silva Correa, Kirkland, WA (US); Elizabeth Marie Parker, Redmond, WA (US); Anna Jo McMahon, Excelsior, MN (US); John Charles Lorenz, Bellevue, WA (US); Justin Pae, Mercer Island, WA (US); Teslim Abiodun Alabi, Bothell, WA (US); Christa Annette Keizer, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/019,194

(22) Filed: Sep. 11, 2020

(51) Int. Cl.
*G06F 8/38* (2018.01)
*G06F 3/0482* (2013.01)
*G06F 9/451* (2018.01)

(52) U.S. Cl.
CPC .............. *G06F 8/38* (2013.01); *G06F 3/0482* (2013.01); *G06F 9/451* (2018.02)

(58) Field of Classification Search
CPC .......... G06F 3/38; G06F 9/451; G06F 3/0482
USPC .......................................................... 715/762
See application file for complete search history.

(56) References Cited

U.S. PATENT DOCUMENTS

| 9,880,735 | B2 * | 1/2018 | Dascola | G06F 3/0482 |
| 10,783,576 | B1 * | 9/2020 | Van Os | G06F 21/31 |
| 2016/0370956 | A1 * | 12/2016 | Penha | G06F 3/04817 |
| 2018/0121881 | A1 * | 5/2018 | Kumar | G06F 3/04842 |
| 2018/0329587 | A1 * | 11/2018 | Ko | G06F 3/0485 |
| 2019/0079662 | A1 * | 3/2019 | Wan | G06F 3/04883 |
| 2019/0258373 | A1 * | 8/2019 | Davydov | G06F 3/0488 |

* cited by examiner

*Primary Examiner* — William D Titcomb
(74) *Attorney, Agent, or Firm* — Liang IP, PLLC

(57) ABSTRACT

Implementations of customizable graphical user interfaces for data management in computing systems are disclosed herein. In one example, a computer application is executed on a computing device to provide a graphical user interface having a background containing multiple interface regions separate from one another and individually having a corresponding data source. Upon receiving a command from a user, the executed computer application can customize the graphical user interface by modifying a size, a relative placement, a data source, or a format of one or more of the multiple interface regions in accordance with the command from the user, and thus allowing customization of the graphical user interface.

20 Claims, 6 Drawing Sheets

CUSTOMIZABLE GRAPHICAL USER INTERFACE FOR DATA MANAGEMENT

BACKGROUND

Graphical user interface (GUI) is a form of machine-user interface or view that allows a user to visualize and interact with digital data through graphical icons surfaced on computer displays. For instance, an electronic calendar can provide various interfaces with graphical elements representing an appointment book, an address book, or a task list. In one example, an electronic calendar can have a grid-like interface with a row of blocks representing different days and multiple columns representing time slots for each day. The interface can also include rectangles, circles, dots, or other suitable icons that represent appointments or events for certain days/time slots on the grid-like interface. Through the surfaced grid-like interface of the electronic calendar, a user can view, add, edit, or delete appointment or events in the electronic calendar.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though graphical user interfaces can allow more ready user interaction with digital data and applications than text-based interfaces, certain GUIs can still be so inflexible to diminish their usefulness. For instance, a rigid grid-like interface for an electronic calendar is typically not customizable to allow a user to focus on select events or tasks than others. Instead, all events are presented using the same graphical icons on the grid-like interface. Also, a user may have multiple calendars such as a work calendar and a personal calendar. However, when events from both the work and personal calendars are presented on the same grid-like interface, the electronic calendar can become cluttered with overlapping graphical icons. In addition, to effectively manage various activities, a user may need to access an appointment book as well as other types of information, such as an address book or a task list. However, information from such diverse sources is typically surfaced via different interfaces. A user thus may need to navigate through multiple user interfaces in order to access pertinent information.

Several embodiments of the disclosed technology are directed to implementing a customizable graphical user interface for managing data from various information sources in a computer application executed by a computing device. In one implementation, the computer application can be an electronic calendar and include executable instructions execution of which surfaces a background (referred to herein as a canvas). The canvas can be configured to contain various user customizable interface regions isolated from one another. Each interface region can be configured to surface data from a corresponding information source. Suitable information sources can include appointment books, address books, task lists, or other suitable information sources.

In certain embodiments, the canvas and one or more interface regions in the canvas can be implemented as individual data objects according to Object Linking and Embedding (OLE). For example, the canvas can be implemented as a container object such as an OleWindow. The one or more interface regions can be implemented as child objects of the container object corresponding to the canvas. The one or more interface regions can be additional OleWindow, OleDocument, or other suitable types of objects, which in turn may include additional layers of embedded data objects. In other implementations, the canvas and one or more interface regions can also be implemented as data objects of JavaScript or other suitable types of computer programming languages.

Individual data objects corresponding to the canvas and the one or more interface regions can include suitable instructions to allow surfacing of certain information as well as interacting with the surfaced information by a user. The one or more interface regions can be arranged, sized, formatted, or otherwise manipulated on the canvas in any suitable ways without being surfaced in a rigid grid-like view. In one specific example, a canvas can contain a first interface region configured to surface a work calendar while a second interface region can be configured to surface a personal calendar of a user. The electronic calendar can allow the user to arrange, size, format, configure, or otherwise manipulate the first and second interface regions on the background without being limited to a grid-like view. For instance, the user can resize the second interface region surfacing the personal calendar to be smaller than the first interface region. The user can also change a relative placement between the first and second interface regions, such as from a side-by-side arrangement to a staggered arrangement. The user can further configure the first and second interface regions to surface the work and personal calendars using the same or different icons, formats, or graphical representations. As such, the electronic calendar can allow the user to declutter the surfaced information from both the work and personal calendars.

In other examples, both the first and second interface regions can be configured to surface the same calendar with different icons, formats, or graphical representations of the surfaced information. For instance, the first interface region can be configured to surface a week-view of the work calendar while the second interface region can be configured to surface an event-view of the same work calendar. In another instance, the first interface region can be configured to surface a month-view of the work calendar while the second interface region can be configured to surface a day-view of the same work calendar. As such, the electronic calendar can provide different views of the same information such that the user can better distinguish various appointments or events with different time horizons or according to other suitable parameters. In further embodiments, the canvas can also be configured to include additional interface regions each configured to surface information from an address book, a task list, a weather forecast feed, a bucket list, a note, a link list, a goal list, or other types of suitable information source.

In one implementation, certain interface regions on the canvas can be created by default upon activation of a canvas view. For example, the electronic calendar can provide a button, a list item, a menu item, or other suitable types of interface element for activating the canvas view. Upon detecting a user actuation of the interface element, the electronic calendar can surface a canvas with one or more interface regions individually corresponding to an appointment book, an address book, a task list, or another suitable information source. The electronic calendar can then be configured to allow the user to customize the surfaced interface regions via moving, resizing, arranging, deleting, adding, or otherwise manipulating the surface interface regions. In other implementations, the electronic calendar can be configured to provide a blank canvas upon receiving the user input for activating the canvas view. The user can then add suitable interface regions for corresponding information sources via, for instance, inserting interface regions from an interface region template.

Several embodiments of the disclosed technology can thus improve usability of the computer application by providing a flexible, not a rigid non-customizable, graphical user interface to surface data from various information sources. For example, the electronic calendar can be configured to surface different views of the same calendar via different interface regions customizable on the same canvas to distinguish different events. In another example, related information for performing certain tasks can be collectively placed on the same canvas via different interface regions. For instance, a task list and a weather forecast can be surfaced via separate interface regions next to another interface region that surfaces a calendar of a user. As such, the user can readily determine whether an outdoor activity on a certain date/time is feasible given any pending tasks and weather forecast without navigating through different interfaces and/or applications on a computing device. Thus, the computer application can be user friendly while system resource consumption such as processor cycles and memory allocations are reduced to improve system performance of the computing device.

DETAILED DESCRIPTION

Certain embodiments of systems, devices, components, modules, routines, data structures, and processes for implementing customizable graphical user interface for data management in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

Inflexibility of certain graphical user interfaces of computer applications can diminish usefulness of any computing services provided by the computer applications. For example, a rigid grid-like interface for an electronic calendar is typically not customizable to emphasize select events or tasks. Instead, all events are presented using the same graphical icons on the grid-like interface. Also, when events from multiple calendars of a user are presented on the same interface, the electronic calendar can become cluttered and hard to use. In addition, to effectively manage various activities, a user may need to access an appointment book as well as other types of information from sources such as an address book or a task list. However, information from diverse data sources is typically surfaced via different user interfaces. A user thus may need to navigate through multiple interfaces in order to access pertinent information.

Several embodiments of the disclosed technology are directed to implementing a customizable graphical user interface for managing data from various information sources in a computer application executed by a computing device. Instead of having a rigid and non-customizable graphical user interface, embodiments of the disclosed technology provide a flexible and customizable graphical user interface with a background as a container configured to hold one or more interface regions. Each interface region can be linked to a corresponding data source, such as a calendar, a task list, a contact list, a weather forecast, or other suitable sources. Each interface region can also be configured to allow modifications of one or more of a size, relative placement, data source, format, or other suitable types of parameter of the interface region. As such, the computer application can allow a user to arrange, add, delete, modify, or otherwise manipulate information surfaced via the various interface regions on the background in a flexible manner instead of being limited to a rigid grid-like view. Such flexible graphical user interface can thus improve usability of the computer application as well as conserving system resources such as processor cycles and memory allocations to improve system performance of the computing device, as described in more detail below with reference to FIGS. 1-5.

Figure 1:
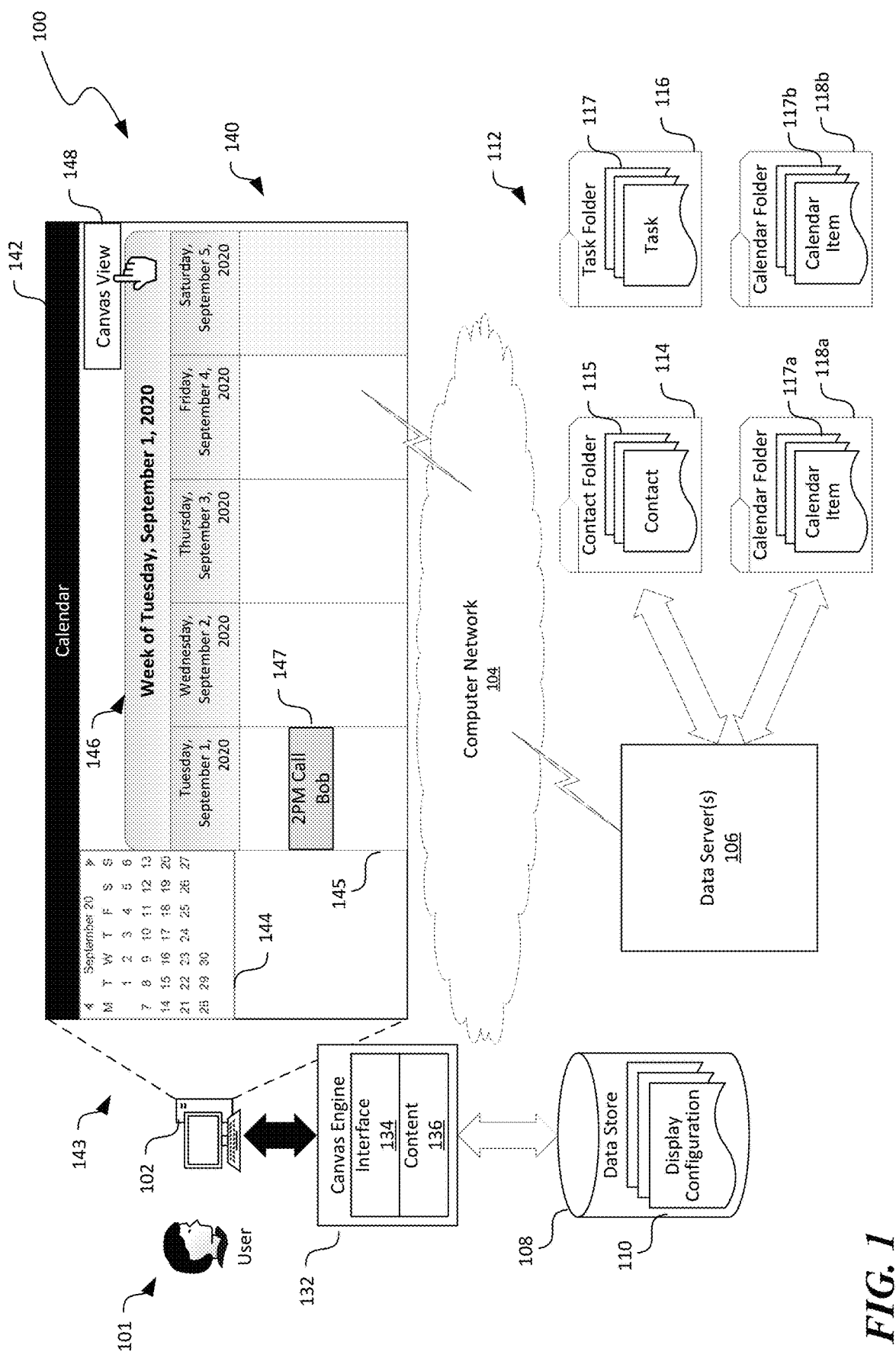
FIGS. 1-3 are schematic block diagrams illustrating an example computing system implementing a customizable graphical user interface for data management in accordance with embodiments of the present technology.
Figure 2:
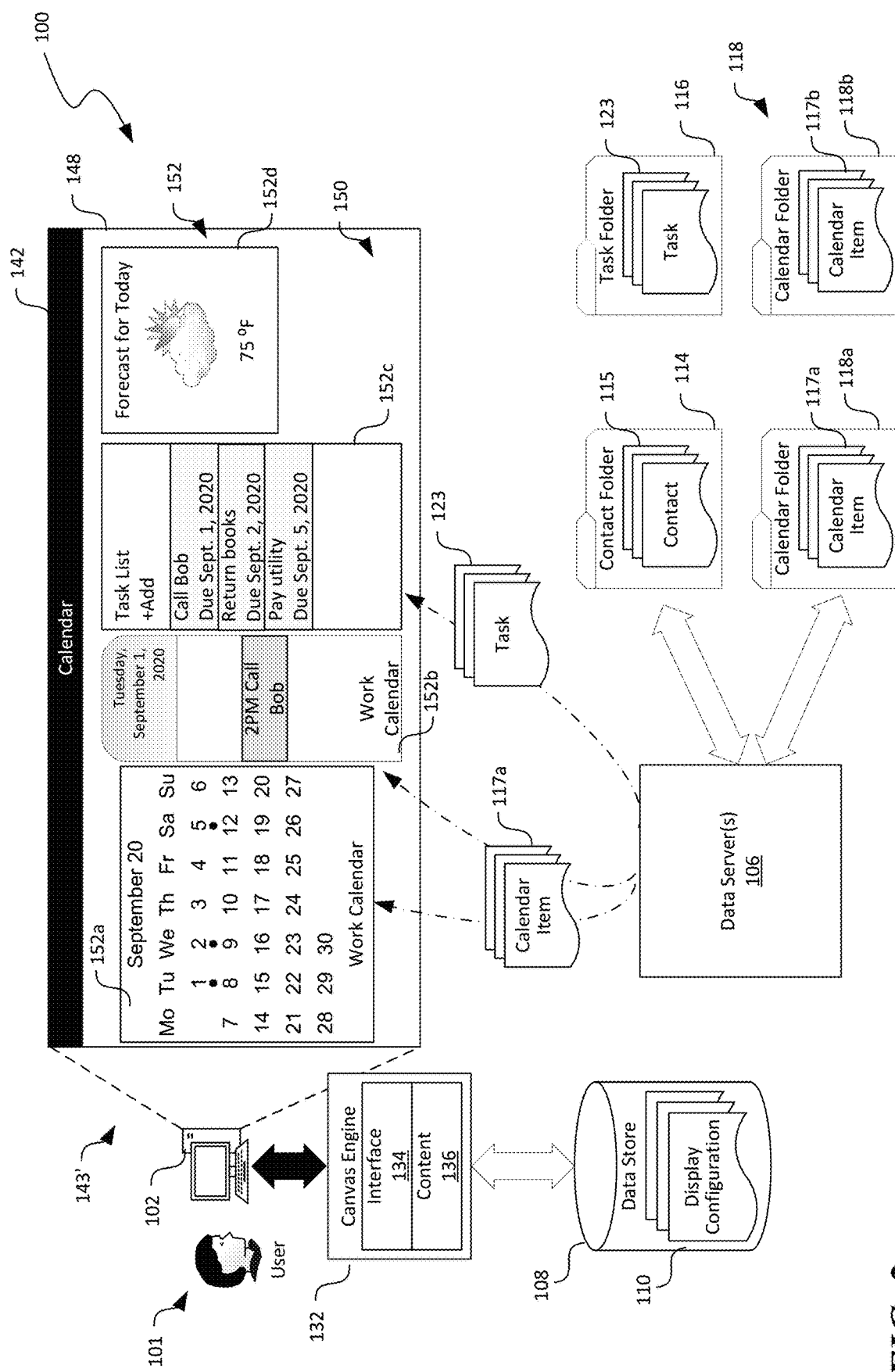
Figure 3:
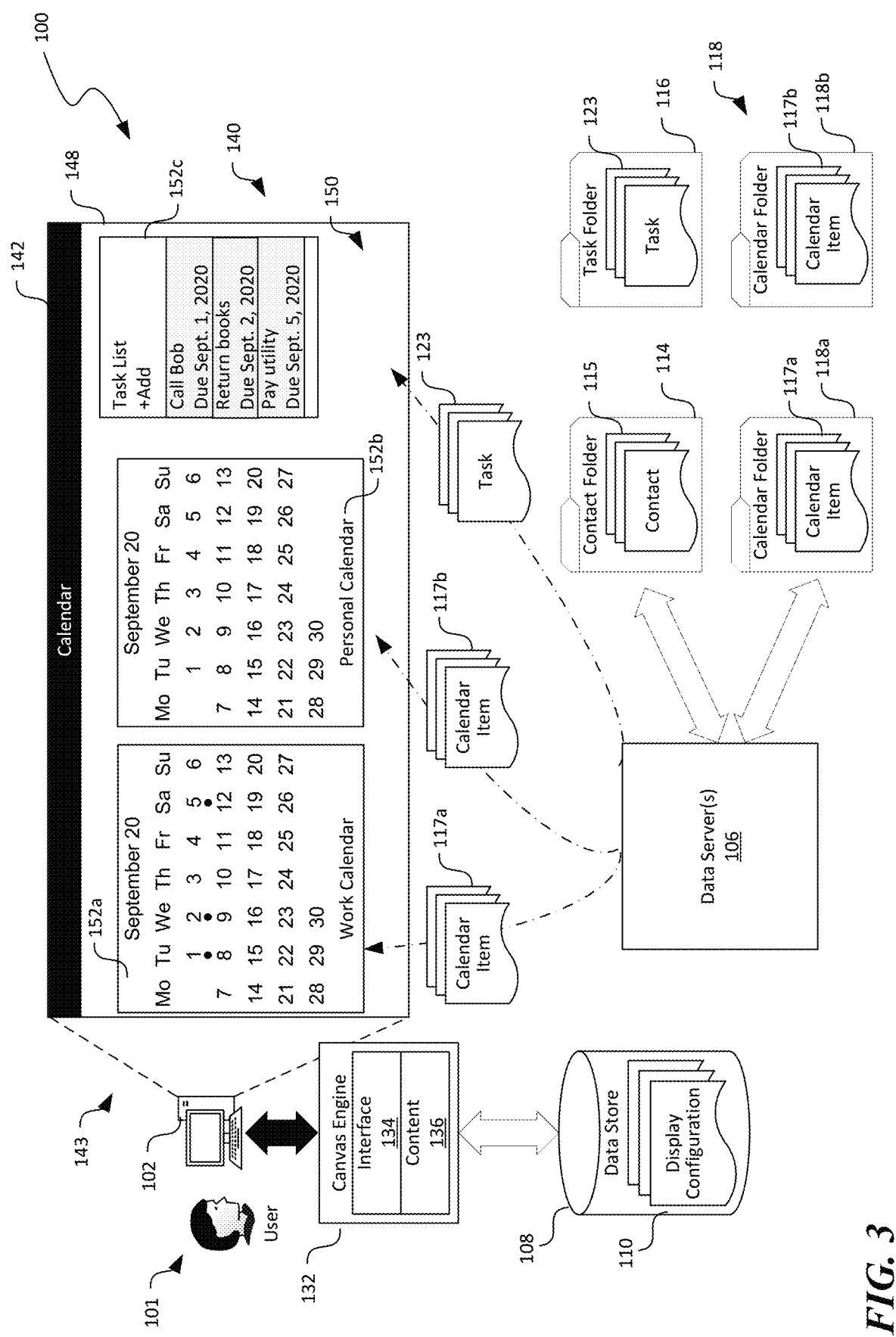

FIGS. 1-3 are schematic block diagrams of an example computing system 100 implementing a customizable graphical user interface for data management in accordance with embodiments of the present technology. In FIGS. 1-3 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

As shown in FIG. 1, the example computing system 100 includes a computer network 104 interconnecting a client device 102 with a data server 106. The computer network 104 can include an intranet, a wide area network, the Internet, or other suitable types of computer network. Even though particular components of the computing system 100 are shown in FIG. 1, in other embodiments, the computing system 100 can also include additional and/or different components or arrangements. For example, in certain embodiments, the computing system 100 can also include an email server (not shown) that is configured to receive, process, and forward emails from/to the client device 102. In other embodiments, the data server 106 can be interconnected to one or more additional client devices (not shown) in addition to or in lieu of the client device 102. In further embodiments, the computing system 100 can also include one or more network storage devices, additional servers, and/or other suitable components (not shown).

As shown in FIG. 1, the data server 106 can be interconnected with or otherwise have access to various data sources 112. For example, as shown in FIG. 1, the data sources 112 can include a contact folder 114 containing records of contacts 115, a task folder 116 containing records of tasks 117, a first calendar folder 118a containing calendar items 117a, and a second calendar folder 118b containing records of calendar items 117b. The contacts 115 can include data representing names, addresses, phone numbers, email addresses, or other suitable information. The tasks 117 can include data each representing a job to be accomplished and a due date. The calendar items 117a and 117b can include data representing an appointment or event with corresponding date/time, location, or other suitable information. In other examples, the data sources 112 can also include one or more email folders (not shown) containing electronic messages, a file folder (not shown) containing documents or other suitable types of files, a weather forecast source, or other suitable types of data sources. During operation, the data server 106 can provide suitable information to the client device 102 from the various data sources 112, as described in more detail below.

The client device 102 can include a computing device that is configured to facilitate accessing computing services and/or digital data provided by the data server 106 via the computer network 104. For example, in the illustrated embodiment, the client device 102 includes a desktop computer configured to execute suitable instructions of a computer application 140 to provide an electronic calendar 142. In other embodiments, the client devices 102 can also include laptop computers, tablet computers, smartphones, or other suitable computing devices configured to execute suitable instructions to provide a web browser, an email client, a calendar client, a contact list client, or other suitable computing services.

FIG. 1 shows an example graphical user interface 143 of the electronic calendar 142. As shown in FIG. 1, the graphical user interface 143 can include a monthly view 144 and a weekly view 145 of a calendar 146 of the user 101. In the illustrated example, an appointment 147 is shown as a block having an annotation (e.g., "2 PM Call Bob") placed in a corresponding column and row of a grid-like weekly view. However, the grid-like weekly view of the electronic calendar 142 can be inflexible to efficiently present additional and/or different pertinent information to the user 101. For example, when calendar items 117a and 117b from both the first and second calendar folder 118a and 118b are presented on the same graphical user interface 143, the presented view to the user 101 can be cluttered and difficult to read.

To address the foregoing difficulties, a canvas engine 132 can be implemented on the client device 102 as shown in the implementation of FIG. 1. In one embodiment, the canvas engine 132 can be an integral part of the computer application 140 corresponding to the electronic calendar 142. In another embodiment, the canvas engine 132 can be an add-on to the computer application 140. In other embodiments, the canvas engine 132 can be implemented as a computing service by executing suitable instructions on, for example, the data server 106 or other suitable servers (not shown). In the illustrated embodiment, the user 101 can activate the canvas engine 132 to access the customizable graphical user interface by actuating, for instance, via a click, on a button 148 labeled "Canvas View." In other embodiments, the user 101 can activate the canvas engine 132 via a menu item, an icon, or other suitable interface elements (not shown).

As shown in FIG. 1, the canvas engine 132 can include an interface module 134 and a content module 136 operatively coupled to each other. The canvas engine 132 can also be interconnected to a data store 108 containing one or more display configuration files 110 individually having data representing a set of values of configurations and/or attributes of a customizable graphical user interface. Though particular modules are shown in FIG. 1 for illustration purposes, in other embodiments, the canvas engine 132 can also include input/output, database, network, or other suitable types of modules. Functionalities and operations of the interface module 134 and the content module 136 are described in more detail below with reference to FIG. 2.

The interface module 134 can be configured to generate and surface a customizable graphical user interface 143' instead of a rigid grid-like interface for displaying information from the various data sources 112. As shown in FIG. 2, the customizable graphical user interface 143' can include a background 150 containing multiple interface regions 152 each corresponding to a data source 112. In the illustrated example in FIG. 2, the multiple interface regions 152 include a first interface region 152a configured to surface a calendar (i.e., "Work Calendar"), a second interface region 152b configured to surface the same work calendar but with a different display format (i.e., a daily view format), a third interface region 152c configured to surface a task list, and a fourth interface region 152d configured to surface a daily weather forecast.

In certain embodiments, the background 150 and the multiple interface regions 152 can be implemented as data objects according to Object Linking and Embedding (OLE). For example, the background 150 can be implemented as a container object such as an OleWindow. The one or more interface regions 152 can be implemented as child objects of the container object corresponding to the background 150. The one or more interface regions 152 can be additional OleWindow, OleDocument, or other suitable types of OLE objects, which in turn may include additional layers of embedded data objects. In other implementations, the background 150 and the multiple interface regions 152 can also be implemented as data objects of JavaScript or other suitable types of computer programming languages.

In certain implementations, the background 150 and the interface regions 152 on the background 150 can be created by default upon activation of the canvas engine 132. In other implementations, the canvas engine 132 can be configured to provide a blank background 150 upon receiving the user input for activating the canvas engine 132. The canvas engine 132 can then be configured to allow the user 101 to add suitable interface regions 152 for corresponding data sources 112 via, for instance, inserting interface regions 152 from an interface region template (not shown).

The resulting customizable graphical user interface 143' can then be saved as a configuration file 110 in the data store 108. The configuration file 110 can include structured or non-structured data that describe various attributes and configurations of the graphical user interface 143'. For example, the configuration file 110 can include description of a size (e.g., in two dimensional measurements), position (e.g., in relative or absolute pixel offsets), format (e.g., monthly view, weekly view, or daily view), or other suitable attributes of the background 150 and the interface regions 152. Subsequently, upon detecting an actuation of the button 148 (shown in FIG. 1) for the canvas engine 132, the interface module 132 can be configured to retrieve the previously saved configuration file 110 and render to surface the background 150 with the multiple interface regions 152 on the client device 102 according to the various parameters included in the retrieved configuration file 110.

Upon surfacing the multiple interface regions 152 on the background 150, the content module 136 can be configured to determine corresponding data sources 112 for each of the interface regions 152, retrieve data from the determined data sources 112, and surface the retrieved data in the corresponding interface regions 152. For instance, in the illustrated example in FIG. 2, the content module 136 can determine that the first and second interface regions 152a and 152b are both linked to the calendar folder 118a corresponding to a work calendar. In response, the content module 136 can retrieve, via the data server 106, the calendar items 117a from the calendar folder 118a and surface the retrieved calendar items 117a in both the first and second interface regions 152a and 152b. The first interface region 152a has a monthly view while the second interface region 152b has a daily view. The content module 136 can also be configured to determine that the third interface region 152c is linked to data in the task folder 116. In turn, the content module 136 can retrieve data representing the tasks 123 and provide the tasks 123 to be surfaced via the third interface region 152c. In addition, the content module 136 can be configured to determine that the fourth interface region 152d is configured to display a daily weather forecast. In response, the content module 136 can be configured to retrieve weather data from a weather forecast source (not shown) and surface the retrieved weather data in the fourth interface region 152d.

The graphical user interface 143' is customizable by allowing the user 101 to modify one or more of a size, relative placement, data source, format, or other suitable types of attribute of the individual interface regions 152 and the background 150. For instance, as shown in FIG. 3, the second interface region 152b has been modified from a daily view to a monthly view. A data source of the second interface region 152b is also changed from the calendar folder 118a to the calendar folder 118b corresponding to a personal calendar of the user 101. The user 101 can make the foregoing changes via a menu or other suitable interface elements. In response, the interface module 134 can be configured to adjust the view of the second interface region while the content module 136 can be configured to retrieve data from the calendar folder 118b and provide the retrieved calendar items 117b to the second interface region 152b.

Also shown in FIG. 3, the third interface region 152c is resized and reallocated relative to the first and second interface regions 152a and 152b while the fourth interface region 152d is deleted from the background 150. In other examples, the background 150 can be enlarged, reshaped, or otherwise modified. In turn, the interface module 134 can be configured to automatically resize, rearrange, or otherwise modify the various interface regions 152 to conform with the modified background 150.

Several embodiments of the disclosed technology can thus improve usability of the computer application 140 by providing a flexible and customizable graphical user interface 143' to surface data from various data sources 112. For example, the computer application 140 can be configured to surface different views of the same calendar via different interface regions 152 on the same background 150 to distinguish different events. In another example, related information for performing certain tasks can be collectively placed on the same background 150 via different interface regions 152. For instance, the tasks 123 and a weather forecast can be surfaced via separate interface regions 152 next to another interface region 152 that surfaces a calendar of the user 101. As such, the user 101 can readily determine whether an outdoor activity on a certain date/time is feasible given any pending tasks and weather forecast without needing to navigate through multiple different interfaces and/or computer applications on the client device 102. Thus, the usability of the computer application 140 can be improved while system resource consumptions such as processor cycles and memory allocations can be reduced to improve performance of the client device 102.

Figure 4A:
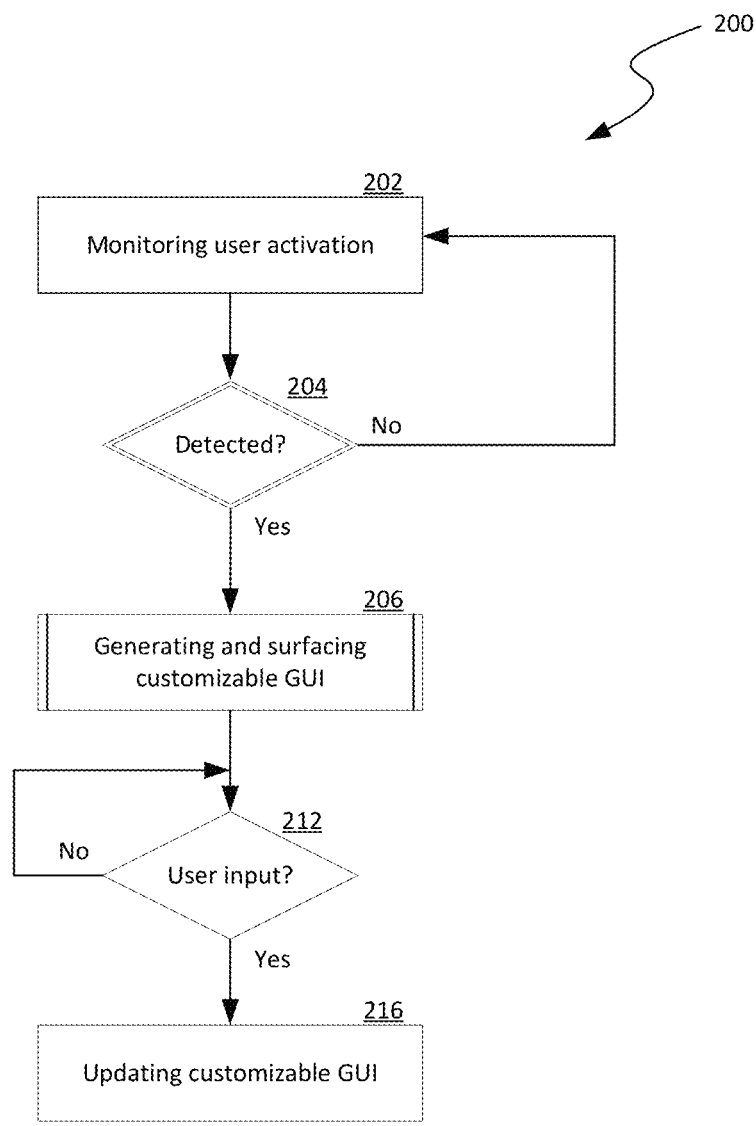
FIGS. 4A and 4B are flow diagrams illustrating aspects of processes for implementing a customizable graphical user interface for data management in accordance with embodiments of the present technology.
Figure 4B:
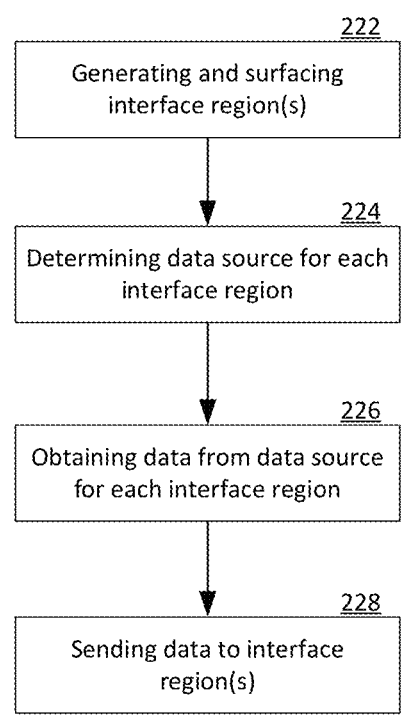

FIGS. 4A and 4B are flow diagrams illustrating aspects of processes for implementing a customizable graphical user interface for data management in a computing system in accordance with embodiments of the present technology. Even though various aspects of the processes are described below in the context of the example computing system 100 in FIGS. 1-3, in other embodiments, various aspects of the processes can also be implemented in computing systems with additional and/or different components.

As shown in FIG. 4A, a process 200 can include monitoring for user activation of a customizable graphical user interface at stage 202. In one example, monitoring for user activation can include monitoring for a user input on an interface element, such as the button 148 in FIG. 1. In other examples, monitoring for user activation can include monitoring for a user input on a menu item or other suitable types of input. The process 200 can then include a decision stage 204 to determine whether user activation is detected. In response to determining that the user activation is not detected, the process 200 reverts to monitoring user activation at stage 202. In response to determining that user activation is detected, the process 200 proceeds to generating and surface a customizable graphical user interface at stage 206. Example operations of generating and surfacing the customizable graphical user interface are described in more detail below with reference to FIG. 4B.

The process 200 can then include another decision stage 212 to determine whether a user input representing a command to modify the customizable graphical user interface is received. Such user input can include drag-and-drop using a pointing device, such as a mouse, or via other suitable input techniques. In response to determining that such a user input is received, the process 200 proceeds to updating the customizable graphical user interface according to the received user input at stage 216. Examples of updating the customizable graphical user interface are described above with reference to FIGS. 1-3. Otherwise, the process 200 reverts to continuing monitoring for user input at stage 212.

As shown in FIG. 4B, operations for generating and surfacing the customizable graphical user interface can include generating and surfacing one or more interface regions on a background at stage 222. The operations can then proceed to determining a data source corresponding to each of the interface regions at stage 224. The operation can further include obtaining data from the determined data sources at stage 226 and sending the obtained data to be surfaced in corresponding interface regions at stage 228.

Figure 5:
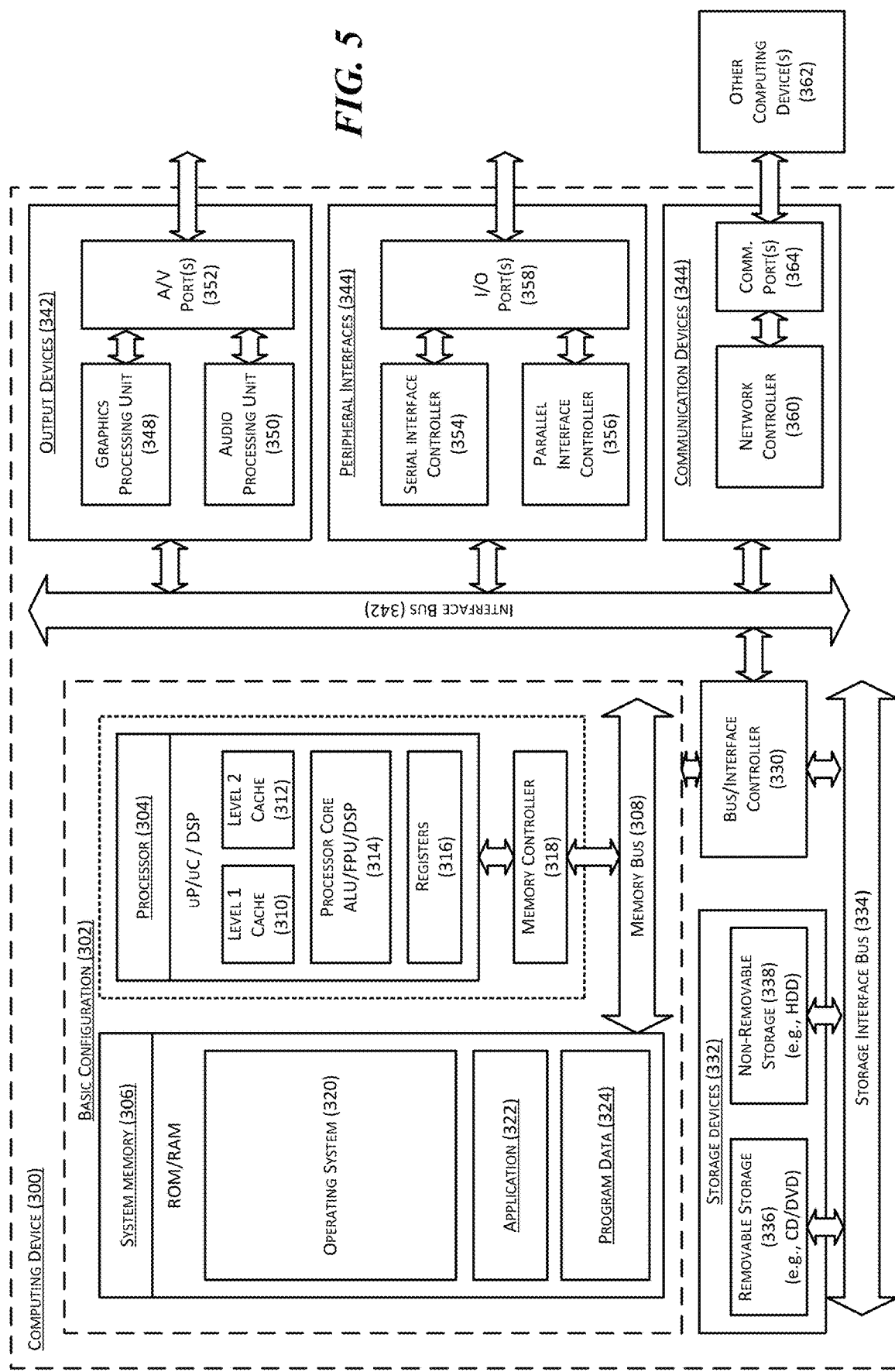
FIG. 5 is a computing device suitable for certain components of the computing system in FIGS. 1-3.

FIG. 5 is a computing device 300 suitable for certain components of the distributed computing system 100 in FIG. 1, for example, the server 106, the client device 102, or the resource manager 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 5, the operating system 320 can include a hypervisor 140 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile as well as removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of implementing customizable user interface for data management in a computing device having a processor and a display operatively coupled to each other, the method comprising:

executing, with the processor, a computer application on the computing device to provide an electronic calendar having a graphical user interface surfaced on the display of the computing device, the graphical user interface having a background containing first and second interface regions in the background, wherein the individual first and second interface regions surfacing a first calendar and a second calendar, respectively, the first and second calendars having first and second data sources, respectively, that are different from each other; and a third interface region adjacent to the first and second interface regions, the third interface region surfacing a task list of the user;

receiving, via the surfaced graphical user interface on the display of the computing device, an input from a user, the input representing a command to modify a size, a relative placement, a data source, or a format of one or more of the first, second, or third interface regions in the background; and in response to receiving the input from the user, modifying a size, a relative placement, a data source, or a format of one of the one or more first, second, and third interface regions in accordance with the command corresponding to the received input from the user, thereby allowing customization of the graphical user interface of the electronic calendar surfaced on the display of the computing device.

2. The method of claim 1 wherein modifying a size, a relative placement, a data source, or a format of one or more of the first, second, and third interface regions includes modifying the first data source of the first calendar to be the same as that of the second calendar.

3. The method of claim 1, further comprising:
receiving another input from the user, the another input representing a command to add a fourth interface region to the background, the fourth interface region being separate from the first, second, and third interface regions; and in response to receiving the another input from the user, adding the fourth interface region to the background.

4. The method of claim 1 wherein:
receiving another input from the user, the another input representing a command to delete the second interface region from the background; and in response to receiving the another input from the user, deleting the second interface region from the background while maintaining the first and third interface regions in the background.

5. A method of implementing customizable user interface for data management in a computing device having a processor and a display operatively coupled to each other, the method comprising:
executing, with the processor, a computer application on the computing device to provide an electronic calendar having a graphical user interface surfaced on the display of the computing device, the graphical user interface having a background containing multiple interface regions in the background, wherein the multiple interface regions each having a corresponding data source;

receiving, via the surfaced graphical user interface on the display of the computing device, an input from a user, the input representing a command to modify a size, a relative placement, a data source, or a format of one of the multiple interface regions in the background; and in response to receiving the input from the user, modifying a size, a relative placement, a data source, or a format of one of the multiple interface regions in accordance with the command corresponding to the received input from the user, thereby allowing customization of the graphical user interface of the electronic calendar surfaced on the display of the computing device.

6. The method of claim 5 wherein:
the multiple interface regions include a first interface region and a second interface region separate from each other; and the method further includes surfacing, on the background of the graphical user interface, a first calendar of the user in the first interface region and a second calendar of the user in the second interface region, the first and second calendars having first and second data sources, respectively, that are different from each other.

7. The method of claim 5 wherein:
the multiple interface regions include a first interface region and a second interface region separate from each other; and the method further includes surfacing, on the background of the graphical user interface, a first calendar of the user in the first interface region and a second calendar of the user in the second interface region, the first and second calendars having a single data source but first and second display formats, respectively, that are different from each other.

8. The method of claim 5, further comprising:
the multiple interface regions include a first interface region and a second interface region separate from each other; and the method further includes:
surfacing, on the background of the graphical user interface, a first calendar of the user in the first interface region and a second calendar of the user in the second interface region, the first and second calendars having first and second data sources, respectively, that are different from each other; and wherein modifying a size, a relative placement, a data source, or a format of one of the multiple interface regions includes modifying the data source of the second interface region to be the same as that of the first interface region.

9. The method of claim 5, further comprising:
the multiple interface regions include a first interface region and a second interface region separate from each other; and the method further includes:
surfacing, on the background of the graphical user interface, a first calendar of the user in the first interface region and a second calendar of the user in the second interface region, the first and second calendars having a single data source but first and second display formats, respectively, that are different from each other; and wherein modifying a size, a relative placement, a data source, or a format of one of the multiple interface regions includes modifying the data source of the second interface region to be different than that of the first interface region.

10. The method of claim 5 wherein:
the multiple interface regions include a first interface region and a second interface region separate from each other; and the method further includes:
  receiving another input from the user, the another input representing a command to delete the second interface region from the background; and
  in response to receiving the another input from the user, deleting the second interface region from the background.

11. The method of claim 5 wherein:
the multiple interface regions include a first interface region and a second interface region separate from each other; and
the method further includes:
  receiving another input from the user, the another input representing a command to add a third interface region to the background, the third interface region being separate from the first and second interface regions; and
  in response to receiving the another input from the user, adding the third interface region to the background.

12. The method of claim 5 wherein:
the multiple interface regions include a first interface region and a second interface region separate from each other; and
the method further includes:
  surfacing, on the background of the graphical user interface, a first calendar of the user in the first interface region and a second calendar of the user in the second interface region;
  receiving another input from the user, the another input representing a command to add a third interface region to the background using an interface region template, the third interface region being separate from the first and second interface regions and having a data source corresponding to a task list of the user; and
  in response to receiving the another input from the user, adding the third interface region to the background adjacent to the first and second interface regions;
  retrieving data from the task list of the user; and
  surfacing the retrieved data from the task list in the third interface region.

13. The method of claim 5, further comprising:
upon modifying a size, a relative placement, a data source, or a format of one of the multiple interface regions in accordance with the command, saving a copy of the modified one of the multiple interface regions as an interface region template usable to generate additional interface regions.

14. A computing device, comprising:
a processor; and
a memory operatively coupled to the processor, the memory containing instructions executable by the processor to cause the computing device to:
  execute, with the processor, a computer application on the computing device to provide an electronic calendar having a graphical user interface surfaced on the display of the computing device, the graphical user interface having a background containing multiple interface regions in the background, wherein the multiple interface regions each having a corresponding data source;
  receive, via the surfaced graphical user interface on the display of the computing device, an input from a user, the input representing a command to modify a size, a relative placement, a data source, or a format of one of the multiple interface regions in the background; and
  upon receiving the input from the user, modify a size, a relative placement, a data source, or a format of one of the multiple interface regions in accordance with the command corresponding to the received input from the user, thereby allowing customization of the graphical user interface of the electronic calendar surfaced on the display of the computing device.

15. The computing device of claim 14 wherein:
the multiple interface regions include a first interface region and a second interface region separate from each other; and
the memory includes additional instructions executable by the processor to cause the computing device to surface, on the background of the graphical user interface, a first calendar of the user in the first interface region and a second calendar of the user in the second interface region, the first and second calendars having first and second data sources, respectively, that are different from each other.

16. The computing device of claim 14 wherein:
the multiple interface regions include a first interface region and a second interface region separate from each other; and
the memory includes additional instructions executable by the processor to cause the computing device to surface, on the background of the graphical user interface, a first calendar of the user in the first interface region and a second calendar of the user in the second interface region, the first and second calendars having a single data source but first and second display formats, respectively, that are different from each other.

17. The computing device of claim 14 wherein:
the multiple interface regions include a first interface region and a second interface region separate from each other; and
the memory includes additional instructions executable by the processor to cause the computing device to surface, on the background of the graphical user interface, a first calendar of the user in the first interface region and a second calendar of the user in the second interface region, the first and second calendars having first and second data sources, respectively, that are different from each other; and
wherein to modify a size, a relative placement, a data source, or a format of one of the multiple interface regions includes to modify the data source of the second interface region to be the same as that of the first interface region.

18. The computing device of claim 14 wherein:
the multiple interface regions include a first interface region and a second interface region separate from each other; and
the memory includes additional instructions executable by the processor to cause the computing device to surface, on the background of the graphical user interface, a first calendar of the user in the first interface region and a second calendar of the user in the second interface region, the first and second calendars having a single data source but first and second display formats, respectively, that are different from each other; and
wherein to modify a size, a relative placement, a data source, or a format of one of the multiple interface regions includes to modify the data source of the second interface region to be different than that of the first interface region.

19. The computing device of claim 14 wherein:

the multiple interface regions include a first interface region and a second interface region separate from each other; and the memory includes additional instructions executable by the processor to cause the computing device to receive another input from the user, the another input representing a command to delete the second interface region from the background; and in response to receiving the another input from the user, delete the second interface region from the background.

20. The computing device of claim 14 wherein:

the multiple interface regions include a first interface region and a second interface region separate from each other; and the memory includes additional instructions executable by the processor to cause the computing device to receive another input from the user, the another input representing a command to add a third interface region to the background, the third interface region being separate from the first and second interface regions; and in response to receiving the another input from the user, add the third interface region to the background.

* * * * *